United States Patent [19]

Billette

[11] Patent Number: 5,263,763
[45] Date of Patent: Nov. 23, 1993

[54] VEHICLE SEAT MOUNTING BRACKET

[75] Inventor: David G. Billette, Rochester Hills, Mich.

[73] Assignee: Saturn Corporation, Troy, Mich.

[21] Appl. No.: 7,927

[22] Filed: Jan. 25, 1993

[51] Int. Cl.$^5$ .............................................. B60N 1/02
[52] U.S. Cl. ................................. 296/65.1; 296/63; 297/378.13; 297/440.2
[58] Field of Search .................. 296/65.1, 63, 69; 297/379, 443, 444, 378

[56] References Cited

U.S. PATENT DOCUMENTS

| | | | |
|---|---|---|---|
| 3,411,820 | 11/1968 | Brett et al. | 296/63 |
| 3,915,493 | 10/1975 | Brown | 296/63 |
| 4,286,819 | 9/1981 | Inoue et al. | 296/65.1 |
| 4,958,877 | 9/1990 | Lezotte et al. | 297/378 X |
| 5,015,026 | 5/1991 | Mouri | 297/378 X |
| 5,188,416 | 2/1993 | Kato | 296/69 X |

FOREIGN PATENT DOCUMENTS 15028 1/1982 Japan ............................ 296/65.1

Primary Examiner—Joseph D. Pape
Attorney, Agent, or Firm—Todd L. Moore

[57] ABSTRACT

A vehicle seat mounting bracket for mounting a rear seat back to a vehicle floor without requiring separate fasteners or excessive labor. The vehicle seat mounting bracket has a slotted opening by which an integral trough extends along the slotted opening. The trough guides a pintle that extends outward from the rear seat back into a circular opening in the bracket. The bracket is flexibly connected to the vehicle so as to flex away from the seat back upon the pintle engaging the trough and moving downward toward the circular opening in the bracket. The pintle has an integral ring extending radially outward on the periphery of the pintle. Upon the pintle engaging the circular opening in the bracket, the bracket biasingly moves towards its natural free-state position and engages the integral ring to apply a biasing force toward the seat back and substantially prevent any rattling noise. Upon the pintle engaging the circular opening of the bracket, the trough overlies the pintle and retains the seat back in the bracket.

8 Claims, 1 Drawing Sheet

VEHICLE SEAT MOUNTING BRACKET

The present invention relates to vehicle seat mounting brackets and more particularly to a bracket that retains a vehicle rear seat back without the use of separate fasteners.

BACKGROUND OF THE INVENTION

Generally, rear seat backs are pivotally connected to a vehicle so that the seat back can pivot between an upward normal seating position and a downward position. It is known to establish such a pivotal connection by extending a cylindrical rod or pintle from a side of the seat back and pivotally connecting the pintle to a bracket connected to the vehicle. Many different fastening means are known to be utilized to pivotally connect the pintle to the bracket, such as conventional threaded shafts and nuts, retaining rings and spacers. It is also known to utilize a slotted opening in the bracket and to have the pintle seated in the slotted opening with a spacer placed between the seat back and the bracket to prevent lateral movement of the seat back. This slotted bracket and spacer design is typically used in connection with a latch mounted further upwards on the seat back. The latch detachably connects the seat back to a vehicle support structure to prevent vertical movement of the seat back. The aforementioned pivotal connecting means require a number of fasteners, as well as extensive labor, which both create inefficiencies in cost and quality.

SUMMARY OF THE INVENTION

The present invention solves the above problems by providing a vehicle seat mounting bracket that requires no separate fasteners as well as requiring minimal labor cost and difficulty. The vehicle seat back has a pintle that is guided into engagement with a slotted opening in the vehicle seat mounting bracket by a trough that is integral with the vehicle seat mounting bracket. Upon full engagement of the pintle in the slotted opening, the trough overlies the pintle and prevents vertical movement of the seat back. A positive stop on the pintle is engaged by the vehicle seat mounting bracket to prohibit lateral movement of the seat back.

In the preferred form, the present invention provides a vehicle seat mounting bracket that is connected to a floor of a vehicle. The vehicle seat mounting bracket has a slotted opening with an integral trough extending along an upper portion of the slotted opening. The integral trough has a bottom that defines a ramp that is engaged by a cylindrical rod or pintle extending outward from the side of a vehicle seat back. Upon assembling the seat back to the vehicle, the pintle is maneuvered above the trough of the bracket, and the seat back is lowered towards the floor of the vehicle. The trough acts to guide the pintle into the slotted opening while the end of the pintle engages the ramp of the trough. The seat back is continually moved downward causing the bracket to flex away from the side of the seat back. Upon clearing the ramp of the trough, the pintle engages the opening of the bracket, and the bracket, due to self-biasing forces, returns towards its normal free-state position. Before reaching the free-state position, the bracket engages an integral ring extending radially outward on the pintle and applies a biasing force on the integral ring. The biasing force prevents lateral movement of the seat back and the need for spacers.

Thus, the objects of the present invention are to provide a new and improved vehicle seat mounting bracket that requires no separate fasteners and minimum labor.

DESCRIPTION OF THE PREFERRED EMBODIMENTS

Figure 1:
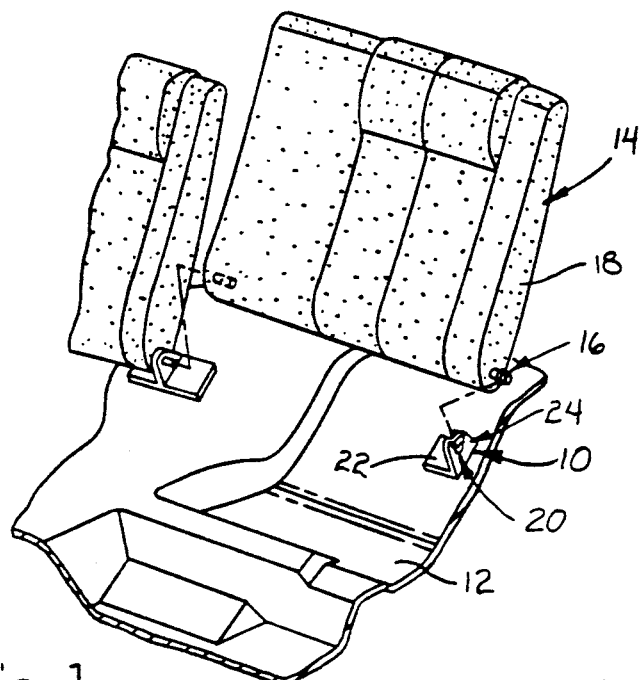
FIG. 1 is an exploded view showing a typical application of the present invention whereby the vehicle seat mounting bracket is connected to the floor of a vehicle, and the rear seat back is pivotally connected to the vehicle seat mounting bracket.

Referring to the drawings, the present invention will now be described in detail with reference to the preferred embodiment.

FIG. 1 is a perspective view showing a vehicle seat mounting bracket (10) connected to a floor (12) of a vehicle. A rear seat back (14) of the vehicle is shown having a pintle or cylindrical rod (16) extending from a side (18) of the seat back (14), and the bracket (10) has a slotted opening (20) that is engaged by the pintle (16). The seat back (14) has a conventional latch (not shown) further upward on the seat back (14) to detachably latch the upper portion of the seat back (14) to the vehicle. When the conventional latch is latched, the pintle (16) and seat back (14) are prohibited from moving. When the conventional latch is unlatched, the seat back (14) pivots between an upward normal seating position, whereby the seat back (14) is substantially perpendicular to a conventional seat cushion (not shown), and a downward position, whereby the seat back (14) pivots at the pintle (16) towards the seat cushion. It should be noted that the present invention is not limited to a rear seat back (14) but rather may be utilized on a front seat back or a seat cushion.

Figure 2:
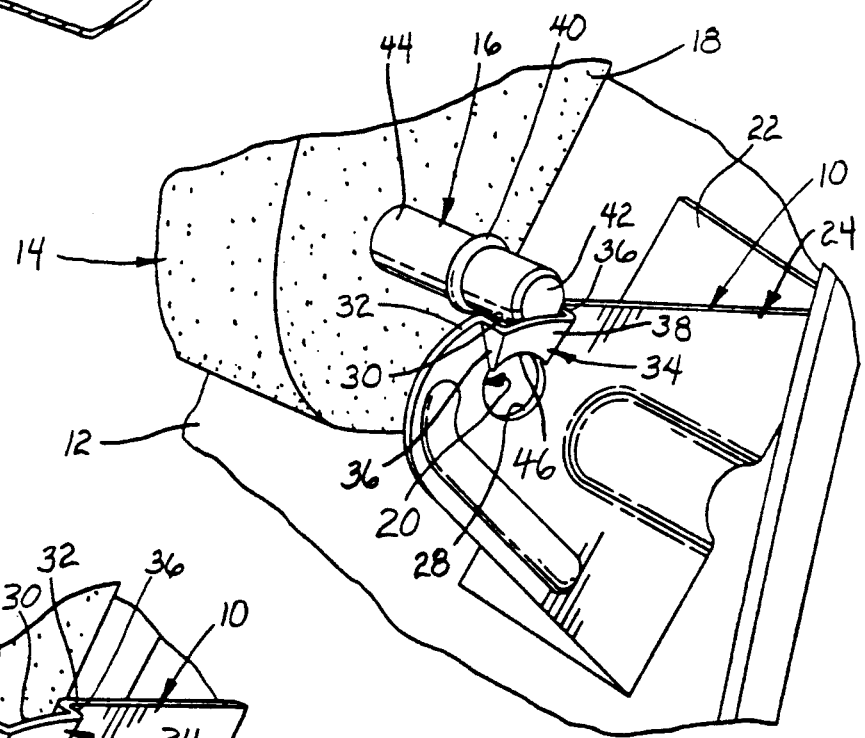
FIG. 2 is an enlarged perspective view showing the pintle being guided into the slotted opening of the vehicle seat mounting bracket.

As seen in FIG. 2, the bracket (10) is comprised of a bottom portion (22) extending parallel to the floor (12) of the vehicle and an upper portion (24) integral with and perpendicular to the bottom portion (22) of the bracket (10). The bottom portion (22) is connected to the vehicle floor (12), and the upper portion extends upward from the floor (12) of the vehicle and is flexible to move toward and away from the side (18) of the seat back (14). Self-biasing forces in the upper portion (24) of the bracket (10) cause the upper portion (24) to always bias towards its normal free-state position upon the upper portion (24) flexing away and toward the seat back (14).

The slotted opening (20) in the upper portion (24) of the bracket (10) is comprised of a substantially circular opening (28) therethrough with a substantially pie shaped slot (30) extending radially outward from the circular opening (28) to an outer edge (32) of the upper portion (24) of the bracket (10).

Figure 3:
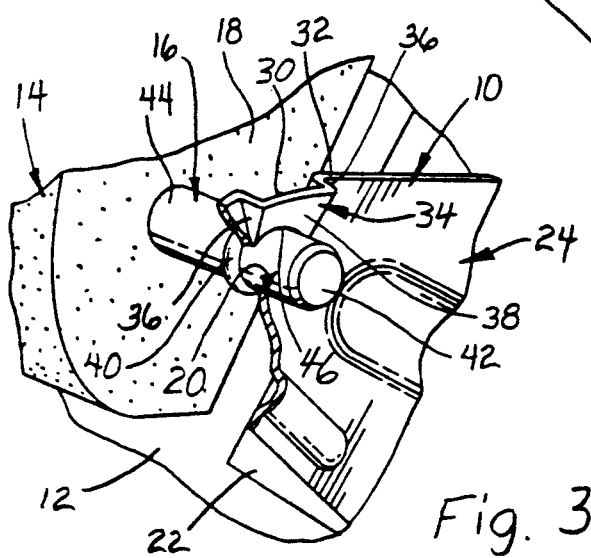
FIG. 3 is a perspective view with a portion of the vehicle seat mounting bracket cutaway to show the pintle engaging the opening of the vehicle seat mounting bracket.

As seen in FIG. 2 and 3, the upper portion (24) of the bracket (10) contains a trough (34) that comprises a pair of sides (36) integral with and perpendicular to the upper portion (24) of the bracket (10) and extending away from the side (18) of the seat back (14). The trough (34) also comprises a bottom on a ramp (38)

integral with and extending between the pair of sides (36). The bottom (38) of the trough (34) acts as a ramp by which to guide the pintle (16) of the seat back (14) into the slotted opening (20) of the upper portion (24) of the bracket (10). The ramp (38) tapers inward toward the upper portion (24) of the bracket (10) by having its outer edge (32) extend furthest from the upper portion (24) of the bracket (10) and having the ramp (38) taper inward towards the circular opening (28) in the upper portion (24). The trough (34) extends along the length of the pie shaped slot (30) to guide the pintle (16) through the pie shaped slot (30) and into the circular opening (28).

The pintle (16) extends outwardly and perpendicularly to the side (18) of the seat back (14) and has a substantially cylindrical shape with an integral ring (40) extending radially outward from the periphery of the pintle (16). The pintle (16) has a free end (42) and an attached end (44) connected to the side (18) of the seat back (14), and the integral ring (40) is positioned substantially mid-way between the ends (42), (44) of the pintle (16).

Upon assembling the seat back to the vehicle, the seat back (14) is maneuvered so that the pintle (16) is positioned over the trough (34) of the bracket, as seen in FIG. 2. The seat back (14) is moved downwardly to lower the pintle (16) into the trough (34). The trough (34) serves to guide the free end (42) of the pintle (16) into the substantially pie shaped slot (30) of the upper portion (24) of the bracket (10). The free end (42) of the pintle (16) engages the bottom or ramp (38) of the trough (34), and upon the seat back (14) moving downward, the pintle (16) causes the bracket (10) to flex outward away from the side (18) of the seat back (14). The seat back (14) and pintle (16) are continually moved downward through the pie shaped slot (30) until the pintle (16) clears the bottom (46) of the ramp (28), and the pintle (16) engages the circular opening (38) of the upper portion (24) of the bracket (10), as seen in FIG. 3.

Upon the pintle (16) clearing the ramp (38) of the trough (34), the upper portion (24) of the bracket (10) biases back towards its natural free-state position until engaging the integral ring (40) of the pintle (16). The integral ring (40) is a positive stop to prevent the upper portion (24) from reaching its natural free-state position. The upper portion (24) of the bracket (10) engages the integral ring (40) of the pintle (16) and applies a biasing force to the integral ring (40) towards the side (18) of the seat back (14). This biasing force on the integral ring (40) restricts lateral movement of the seat back (18) and substantially prevents any rattling created by movement of the seat back (14) relative to the upper portion (24) of the bracket (10). The ramp (38) of the trough (34) overlies the pintle (16) upon engagement of the pintle (16) in the circular opening (28) of the upper portion (24) of the bracket (10) thereby connecting the seat back (14) to the bracket (10) and preventing the pintle (16) from becoming disengaged from the bracket (10).

The embodiments of the invention in which an exclusive property or privilege is claimed are defined as follows:

1. In combination, a vehicle having a body support structure, an upstanding bracket connected with said support structure and therethrough, a vehicle seat having a side and a pintle extending laterally from said side and said seat supported by said bracket when received in said slotted opening, the improvement comprising:

said bracket having a slotted opening and being flexible about its connection with said body structure toward and away from said side of said seat;

means for guiding said pintle into said slotted opening;

means for connecting said guiding means to said bracket;

said seat being connected to said bracket by having said pintle engage said guiding means and by moving said seat and said pintle along said slotted opening; and said pintle engaging said guiding means to flex said bracket away from said side of said seat from its normal free-state position until said pintle clears said guiding means whereupon said bracket, due to its self-biasing forces, returns towards its normal free-state position so that said guiding means overlies said pintle whereby said seat is connected to said bracket and retained thereon without the need for separate fasteners.

2. The combination as defined in claim 1, wherein said means for guiding comprises a trough formed integral with said bracket and having a bottom that defines a ramp which extends along an upper portion of said slotted opening, and said seat being moved to engage said pintle with said ramp and flex said bracket away from said side of said seat and said bracket moving biasingly towards its normal free-state position upon said pintle clearing said ramp.

3. The combination as defined in claim 1, wherein said pintle has a radially outwardly positive stop that prohibits said bracket from returning to its normal free state position, and said bracket biasingly engages said positive stop upon said seat being connected to said bracket to prohibit lateral movement of said seat thereby substantially preventing rattling noise.

4. The combination as defined in claim 3, wherein said positive stop comprises:

said pintle having opposite ends; and an integral ring formed on said pintle intermediate said opposite ends.

5. In combination, a vehicle having a body support structure, an upstanding bracket connected with said support structure and having a slotted opening therethrough, a vehicle seat back having a side and a pintle extending laterally from said side and said seat back supported by said bracket when received in said slotted opening, the improvement comprising:

said bracket being flexible about its connection with said body support structure toward and away from said side of said seat back;

a trough formed integral with said bracket and having a bottom that defines a ramp which extends along an upper portion of said slotted opening;

said seat back being connected to said bracket by positioning said pintle over said trough on said bracket and moving said seat downwardly with said trough guiding said pintle along said slotted opening; and said pintle engaging said ramp to flex said bracket away from said side of said seat back from its normal free-state position until said pintle clears said ramp whereupon said bracket, due to its self-biasing forces, returns towards its normal free-state position so that said bottom of said trough overlies said pintle whereby said seat back is connected to said bracket and retained thereon without the need for separate fasteners.

6. The combination as defined in claim 5, wherein said pintle has a radially outward positive stop that prohibits said bracket from returning to its normal free state position, and said bracket biasingly engages said stop upon said seat back being connected to said bracket to prohibit lateral movement of said seat thereby substantially preventing rattling noise.

7. The combination as defined in claim 6, wherein said positive stop comprises:
   said pintle having opposite ends; and
   an integral ring formed on said pintle intermediate said opposite ends.

8. In combination, a vehicle having a body support structure, an upstanding bracket connected with said support structure and having a slotted opening therethrough, a vehicle rear seat back having a side and a pintle having opposite ends and extending laterally from said side and which is supported by said bracket when received in said slotted opening, the improvement comprising:
   said body support structure of said vehicle having a floor;
   said bracket having a bottom portion integral with and substantially perpendicular to an upper portion extending upward wherein said bottom portion is connected to said floor of said vehicle and said upper portion is flexible with respect to said bottom portion toward and away from said side of said rear seat back;
   said upper portion having an outer edge and a substantially circular opening therethrough;
   a trough formed integral with said bracket and having sides an da bottom wherein said sides are substantially perpendicular from said upper portion of said bracket and extend away from said rear seat back and said bottom connecting said sides to form a ramp extending along said slotted opening;
   said ramp being inclined so that said ramp extends furthest from said side of said rear seat back at said outer edge of said upper portion of said bracket and tapers toward said circular opening of said upper portion;
   said rear seat back being connected to said bracket by positioning said pintle over said trough on said bracket and moving said rear seat back downwardly with said trough guiding said pintle in said slotted opening; and
   said pintle having an integral ring extending radially outward from said pintle intermediate said opposite ends of said pintle and engaging said ramp to flex said upper portion of said bracket away from said side of said rear seat back from its normal free-state position until said pintle clears said ramp and engages said circular opening in said upper portion whereupon said upper portion returns towards its normal free-state position and biasingly engages said integral ring of said pintle so that said ramp overlies said pintle thereby connecting and retaining said rear seat back in said bracket and substantially preventing rattling noise without the need for separate fasteners.

* * * * *